3,539,373
METHOD OF CONTROLLING PLANT
TRANSPIRATION
Anson R. Cooke, Horsham, Pa., assignor to Amchem
Products, Inc., Ambler, Pa., a corporation of Delaware
No Drawing. Filed June 26, 1967, Ser. No. 649,036
Int. Cl. A01n 5/00
U.S. Cl. 117—3                    10 Claims

ABSTRACT OF THE DISCLOSURE

The method of controlling plant transpiration involving use of prepolymers comprising the reaction product of a polyisocyanate and a compound having active hydrogen atoms to control plant transpiration, said method comprising applying said reaction product to leaves of plants.

---

This invention is concerned with processes for the control of plant transpiration.

Plant transpiration is the escape of water vapour to the atmosphere while carbon dioxide and oxygen are being taken in by the plant through the leaf stomates. Ordinarily, the water loss is made up by water taken in from the soil but where no water is available in the soil or where the plant lacks an adequate root system to draw on the water, the water loss can cause the plant to wilt and ultimately to die. This is a severe agronomic problem in areas subject to drought, and it is often the cause of the failure of transplanted nursery stock, of the death of plants during severe cold spells (known as "Winterkill"), and of the denuding of indoor Christmas trees (known as "Needle-drop").

It has already been proposed to use aqueous emulsions of polyvinyl chloride in relatively high concentration to coat plant leaves to minimize water loss caused by plant transpiration. These coatings, however, give very little reduction in the rate of water loss and they do not allow the plant leaf to continue growth.

It has now been discovered that the application of certain prepolymers to plant leaves reduces transpiration while allowing other metabolic processes, including leaf growth, to continue substantially unimpaired.

The prepolymers with which this invention is concerned are the reaction products of polyisocyanates, generally diisocyanates, present in a molar excess with compounds containing active hydrogen atoms. By molar excess of polyisocyanate is meant an excess of the polyisocyanate over that necessary to react with the active hydrogen atoms of the other ingredient.

The prepolymers are prepared by heating the molar excess of a polyisocyanate and the compound having active hydrogen atoms together, and controlling the free isocyanate content to a low value. Low values are preferred for the purposes of this invention since a high free isocyanate content can cause damage to the plant leaf. Preferably, the free isocyanate content is less than about 15 to 20%, dependent on the plant species involved. The free isocyanate content of a prepolymer is determined by reacting a sample thereof with excess n-butylamine in tetrahydrofuran to completion and then determining the excess of the n-butylamine by titration against standard hydrochloric acid solution using a bromphenol blue end point. This method is explained more fully hereinafter.

Appropriate polyisocyanates for use in the formation of the prepolymer include the following:

(1) Alkylene diisocyanates, such as:

ethylene diisocyanate
trimethylene diisocyanate
pentamethylene diisocyanate
octamethylene diisocyanate
hexamethylene diisocyanate
decamethylene diisocyanate
propylene 1,2-diisocyanate
butylene 1,2-diisocyanate
butylene 1,3-diisocyanate (2) Alkylidene diisocyanates, such as:

ethylidene diisocyanate and butylidene diisocyanate (3) Cycloalkylene diisocyanates, such as:
cyclopentenylene 1,3-diisocyanate
cyclopentenylene, 1,2-diisocyanate
cyclohexylene 1,2-diisocyanate
cyclohexylene 1,4-diisocyanate (4) Cycloalkylidene diisocyanates, such as:

cyclopentylidene diisocyanate and
cyclohexylidene diisocyanate (5) Aromatic diisocyanates, such as:

n-phenylene diisocyanate
p-phenylene diisocyanate
2,4-toluene diisocyanate
mixtures of 2,4- and 2,6-toluene diisocyanate
3,3'-dimethyl-diphenylmethane-4,4'-diisocyanate (6) Aliphatic aromatic diisocyanates, such as:

xylxylene-1,3-diisocyanate
xylxylene-1,4-diisocyanate
4,4'-diphenylmethane diisocyanate
4,4'-diphenylpropane diisocyanate (7) Derivatives of higher polyisocyanates such as triphenylmethane triisocyanate and polymethylene polyphenyl isocyanate Appropriate compounds having active hydrogen atoms for use in the formation of the prepolymer include those having hydroxyl and carboxyl groups. Examples of suitable compounds include polyesters and polyethers. The polyesters are formed of polycarboxylic acids and alcoholic compounds. Suitable alcoholic compounds for use in the formation of polyesters include:

(1) Diols such as:

ethylene glycol
diethylene glycol
tetraethylene glycol
propylene glycol
dipropylene glycol
2-ethyl-1,3-hexanediol
2,2-dimethyl-1,6-hexanediol
1,8-octanediol
1,10-decanediol
tetramethylene glycol
1,2-butanediol
1,3-butanediol
2,3-butanediol
2,2-dimethyl-1,3-propanediol
2,2'-diethyl-1,3-propanediol
2-ethyl-2-butyl-1,3-propanediol
2,3-dimethyl-2,3-butanediol
2-methyl-2,4-pentanediol
1,6-hexanediol
2,5-hexanediol (2) Triols including:

glycerine
triethanolamine
pyrogallol
phloroglucinol (3) Monoethers of triols compounds, such as:

glyceryl-alpha-allyl ether
glyceryl-alpha-phenyl ether
glyceryl-alpha-isopropyl ether (4) Triglycerides, hydroxy- containing unsaturated higher fatty acid usually of castor oil.

(5) Tetrols, for example, erythritol and monoethers thereof;

(6) Pentols, such as arabitol, pentaerythritol and xylitol;

(7) Hexols such as sorbitol, dulcitol, mannitol and iditol;

(8) Hydroxy esters such as an ester prepared from 1 mol of dibasic acid and 2 mols of a glycol or polyglycol, a polyester prepared so that the molar ratio of glycol or polyglycol to the basic acid is between 2 and 1, an ester prepared from 1 mol of a dimer acid and 2 mols of a glycol or a polyglycol, an ester prepared from a hydroxy acid and a glycol or a polyglycol so that the molar ratio of the glycol or polyglycol to the hydroxy acid is between 0.5 and 1 and an ester prepared from 1 mol of trihydroxy compound and 1 mol of a monobasic acid such as the monoglyceride of eleostearic acid;

Suitable dibasic acids and derivatives thereof with which the aforesaid alcoholic compounds may be condensed include:

adipic acid
azeilic acid
succinic acid or its anhydride
glutaric acid or its anhydride
phthalic acid or its anhydride
terephthalic acid
1,12-dodecanedioic acid
sebacic acid
dimers of unsaturated higher fatty acids such as dilinoleic acid The polyethers include the so-called "polyoxyalkylene compounds," including polyethylene glycols and polybutylene alcohols, and the alkylene oxide is ethylene oxide or propylene oxide or both, and the polyhydric alcohol is one or more of the following:

ethylene glycol
propylene glycol
1,2-butanediol
1,3-butanediol
1,4-butanediol
2,3-butanediol
2,2-dimethyl-1,3-propanediol
2-ethyl-2-butyl-1,3-propanediol
2,3-dimethyl-2,3-butanediol
2-methyl-2,4-pentadiol
1,6-hexanediol
2,5-hexanediol
2-ethyl-1,3-hexanediol
1,8-octanediol
1,10-decanediol
glycerol trimethylol propane
1,2,6-hexanetriol
glycerine
phloroglucinol
erythritol
arabitol
pentaerythritol
xylitol
sorbitol
dulcitol
mannitol
iditol Hydroxy—terminated polybutadiene may also be used as the compound to be reacted with the polyisocyanate.

Preferred prepolymers include those derived from polyester compounds since these exhibit low sensitivity to ultraviolet light. Specific preferred prepolymers include the reaction product of poly(ethylene adipate) and 4,4′-diphenylmethane diisocyanate; the reaction product of poly(ethylene adipate) and 2,4-toluene diisocyanate; the reaction product of polypropylene glycol diol and mixtures of 2,4 and 2,6-toluene diisocyanate; and the reaction product of polypropylene glycol triol and mixtures of 2,4 and 2,6-toluene diisocyanate.

The advantageous control effect on plant transpiration of the prepolymers used in the method of this invention is shown by the following non-limiting evaluations.

EVALUATION I

The effect on plant transpiration of the prepolymers used in the method of this invention in comparison with the known polyvinyl chloride emulsion was determined using lettuce plants (*Latuca sativa*, Grand Rapids Variety), which were chosen because of their large leaf surface area and high stomate content.

Groups each of two lettuce plants, as uniform as possible, were grown in vermiculite and nutrient solution in plastic pots and sprayed with test solutions each of 5 ml. of a 5% solids solution wt. to vol. The top of each of the pots was covered with a Styrofoam disc, allowing only the plant stem to come through, to prevent surface evaporation. After a 24 hours period for adjustment, the nutrient solution was restored to its original volume and the units were weighed and set in a greenhouse for four hours. They were then reweighed and each plant was excised at the base of the stem and weighed. The results are shown in the following table, expressed in terms of the weight ratio of grams of water transpired per gram of leaf weight. It will be seen that all the prepolymers gave reductions in transpiration better than that given by the emulsion of polyvinyl chloride and that the best result was given by poly (ethylene adipate) mixtures of 2,4 and 2,6-toluene diisocyanate in methyl ethyl ketone. This evaluation as well as others hereinafter was conducted at approximately 80° F. daytime temperature and 60° F. night temperature at about 75% relative humidity.

| | Solution applied | | | |
|---|---|---|---|---|
| Prepolymer 75% in 25% MEK [1] | Percent free NCO of prepolymer before dilution | Approx. molecular wt. of compound having active hydrogen atoms | Solvent | Ratio by wt. of water transpired to plant wt. (gms. water/gm. plant wt.) |
| Poly (ethylene adipate)/2,4-toluene diisocyanate [3] | 4–4.3 | ([2]) | 50% acetone/50% MEK [1] | 1.82 |
| Polypropylene glycol diol/2,4-toluene diisocyanate [3] | 3.15 | 800 | MEK [1] | 2.13 |
| Do.[3] | 3.28 | 2,000 | MEK [1] | 1.97 |
| Do.[3] | 3.28 | 1,500 | MEK [1] | 2.07 |
| Poly (ethylene adipate)/4,4′-diphenylmethane diisocyanate | 3.14 | 1,000 | MEK [1] | 1.8 |
| Emulsion of polyvinyl chloride | | | Water | 2.45 |
| Control | | | | 2.73 |

[1] Methyl ethyl ketone.
[2] Not calculated.
[3] Mixture of 2,4 and 2,6-toluene diisocyanate.

EVALUATION II

Using Norway Spruce (*Picea abies*) as the test plant and applying the prepolymer as a 5% solids solution in a 50:50 mixture of acetone and methyl ethyl ketone, the following results were obtained.

Prepolymer | Percent decrease in water loss relative to a control in 24 hrs.
---|---
Poly(ethylene propylene adipate)/mixture of 2,4 and 2,6-toluene diisocyanate (free NCO=1.8–2.1%) | 58
Poly(ethylene adipate/2,4-toluene diisocyanate (free NCO=4–4.3%) and 2,6-t.d. mixture | 33
Poly(ethylene propylene adipate)/2,4-2,6 mixture toluene diisocyanate (free NCO=6–6.3%) | 37

EVALUATION III

Freshly cut Canadian Balsam Fir trees ("Christmas trees"), each 2–3 meters tall and as uniform as possible were sprayed with 800 ml. of a 5% wt. to vol. solution in acetone of poly(ethylene adipate)/2,4-toluene diisocyanate[1] and then kept indoors for about a month. The weight of needles dropped from the trees was compared with the weight of needles dropped from other trees used as controls, and the following results were obtained.

| | Weight of needles dropped by control trees, g. | Weight of needles dropped by treated trees, g. | Difference, percent |
|---|---|---|---|
| Run: | | | |
| 1 | 27.9 | 16.2 | −42 |
| 2 | 27.1 | 14.8 | −45 |
| 3 | 14.0 | 10.7 | −24 |

These results show a significant reduction in the rate of needledrop caused by water loss due to transpiration.

EVALUATION IV

Grand Rapids lettuce plants in coarse vermiculite-Mag-Amp (a slow release fertilizer) in plastic pots were grown from the seedling stage in a growth chamber at 27° C. day, 16° C. night and 75% relative humidity. All pots were kept saturated with water until ready for treatment. Each plant was then sprayed with 10 ml. of a 5% solid solution (wt. to vol.) in a 50:50 acetone: methyl ethyl ketone solution and then returned to the growth chamber. Styrofoam discs allowing only the plant stem through were placed in each pot to prevent surface evaporation. A first weight reading was taken 4 hrs. after removing pots from water. A second weight reading was taken 3½ hrs. later to determine the water loss. After the second weight was taken, the pots were returned to water overnight. This procedure was followed for 5 days, and each treatment was repeated 5 times.

[1] Mixture with 2,6-toluenediisocyanate.

The following results were obtained:

| Compound applied | Average weight loss of controls, percent | Average weight loss of treated plants, percent |
|---|---|---|
| Polypropylene glycol diol/toluene diisocyanate reaction product (mol. wt. 800,[1] percent NCO=3.15) 75% in a 25% MEK [2] solution | 5.48 | 4.86 |
| Polypropylene glycol triol/toluene diisocyanate (mol. wt. 1,500, percent NCO=3.28) 75% solution in methyl ethyl ketone | 4.76 | 4.6 |
| Polypropylene glycol triol/toluene diisocyanate reaction product (mol. wt. 3,000, percent NCO=3.24) 75% solution in methyl ethyl ketone | 4.76 | 4.54 |
| Poly (ethylene adipate)/toluene diisocyanate reaction product (mol. wt. 1,000, percent NCO=3.05) 75% solution in methyl ethyl ketone | 11.03 | 8.19 |
| Poly (ethylene adipate)/toluene diisocyanate reaction product (mol. wt. 1,000, percent NCO=2.95) 75% solution in methyl ethyl ketone | 9.13 | 6.5 |

[1] This and other mol. wts. refers to the molecular weight of the hydroxy compound. All toluene diisocyanates are mixtures of 2,4 and 2,6 compounds.
[2] Methyl ethyl ketone.

The foregoing evaluations show that representative prepolymers of this invention can be used to treat different types of stomate plant leaves to reduce the water loss caused by plant transpiration and the consequences thereof.

The prepolymers are applied in an organic solvent medium appropriate therefor and which is non-toxic to the plant to be treated. This is advantageously provided by ketones, esters and ethers. Examples are acetone or methyl ethyl ketone or both and also acetonitrile, ethyl acetate, and methylene chloride.

The prepolymers can be used to control plant transpiration from stomata in a wide range of plants. Generally speaking, stomata are present on one or both plant leaf surfaces although they can be present on the plant stem. The prepolymers will be used to control plant transpiration in evergreens, shrubs, trees, foliage and roses. They can also be of value in avoiding or minimizing the consequences of Winterkill, Summer scald, Needledrop and transplant shock. They can also be used to reduce drying out of corns, bulbs and tubers during storage. They can also be used to reduce the water loss by transpiration of cotton, especially that grown under artificial irrigation.

The prepolymers can be applied in solvent medium to the plant leaves at very low concentrations, say from about 0.001 to about 10% by weight. When the concentration is low, more than one application may be desirable to form the necessary coating while at higher concentration, a single application will suffice; it is preferred to use a solution having a solids content of the order of 5% by weight. The solutions may be applied by spray, and conveniently dispensed in an aerosol container. The propellant can be one or more of the halogenated hydrocarbons, known as "Freons."

While it is not intended that this invention be limited in any way by the following theory, it is believed that the prepolymers link to chemically reactive groups in the leaf cuticular surface so binding to the leaf a coating which is permeable to carbon dioxide and air but impermeable to water. The coating exhibits elasticity enabling the leaf to continue growth without distortion, while controlling the rate of water loss by plant transpiration.

In the examples of formulations of prepolymers according to this invention given below, all parts are parts by weight, the molecular weight refers to that of the compound having active hydrogen atoms used to form the prepolymer and the percentage of free isocyanate of the prepolymer after dilution was determined by the following procedure.

Accurately weighed duplicate samples each containing 1 to 1.5 g. of the prepolymer were transferred to 250 ml. glass-stoppered Erlenmeyer or iodine flasks each containing 100 ml. of anhydrous inhibited tetrahydrofuran.

Then 25 ml. of 0.1 N n-butylamine solution in the tetrahydrofuran was added with agitation using a pipette. The flasks were then stoppered and left for ten minutes with frequent swirling. Then a 0.12 solution of bromophenol blue indicator was added and the excess amine was titrated against 0.1 N hydrochloric acid to a yellow endpoint.

The percentage of free isocyanate was then calculated from the expression $$[B-S\times 0.4202]/W$$

where

B=number of ml. of acid required for blank
S=number of ml. of acid required for sample
W=weight of sample (grams).

Example I

| | Parts |
|---|---|
| Poly(ethylene adipate)/toluene diisocyanate reaction product (mol wt.—1000, free isocyanate=3.14%) | 75 |
| Methyl ethyl ketone | 25 |

Example II

| | |
|---|---|
| Polypropylene glycol triol/toluene diisocyanate reaction product (mol wt.—1500, free isocyanate =3.14%) | 75 |
| Methyl ethyl ketone | 25 |

Example III

| | |
|---|---|
| Poly(ethylene adipate)/diphenylmethane diisocyanate (mol wt.—1000, free isocyanate=3.14%) | 60 |
| Acetone | 40 |

Example IV

| | |
|---|---|
| Poly(ethylene adipate) and toluene diisocyanate reaction product (free isocyanate 1.8–2.1%) | 75 |
| Acetone | 12.5 |
| Methyl ethyl ketone | 12.5 |

Example V

| | |
|---|---|
| Poly(ethylene adipate) and toluene diisocyanate reaction product (free isocyanate 4–4.3%) | 75 |
| Methyl ethyl ketone | 25 |

All of the reaction products in the foregoing examples were found to reduce plant transpiration by significant amounts, consistent with the results obtained in Evaluations I, II, III and IV.

Without further elaboration, the foregoing will so fully illustrate my invention that others may be applying current or future knowledge readily adapt the same for use under various conditions of service.

What is claimed as the invention is:

1. A method of controlling plant transpiration comprising applying to a plant in sufficient amount to reduce transpiration, a prepolymer comprising a reaction product of a polyisocyanate having free isocyanate groups, and an organic compound having active hydrogen atoms which are capable of reacting with said free isocyanate groups to form a polyurethane, said prepolymer being applied in an organic solvent medium and polymerizing under ambient conditions to form a polyurethane coating upon said plant to prevent loss of water by way of plant transpiration.

2. The method of claim 1 wherein said prepolymer has a free isocyanate content ranging from 1.8 to less than 20%.

3. The method of claim 2 wherein said prepolymer is the reaction product of a polyester and a diisocyanate.

4. The method of claim 2 wherein said prepolymer is the reaction product of a polyether and a diisocyanate.

5. The method of claim 2 wherein said prepolymer is applied in a solvent selected from the class of ketones, esters and ethers.

6. The method of claim 5 wherein said prepolymer is applied in a solvent selected from acetone and methyl ethyl ketone.

7. The method of claim 3 wherein said prepolymer is the reaction product of poly(ethylene adipate) and 4,4' diphenylmethane diisocyanate.

8. The method of claim 3 wherein said prepolymer is the reaction product of poly(ethylene adipate) and mixtures of 2,4 and 2,6-toluene diisocyanate.

9. The method of claim 3 wherein said prepolymer is the reaction product of polypropylene glycol diol and mixtures of 2,4 and 2,6-toluene diisocyanate.

10. The method of claim 3 wherein said prepolymer is the reaction product of polypropylene glycol triol and mixtures of 2,4 and 2,6-toluene diisocyanate.

References Cited

UNITED STATES PATENTS

| 2,901,467 | 8/1959 | Croco | 117—161 X |
| 3,157,964 | 11/1964 | Ferguson et al. | 47—2 X |
| 3,399,990 | 9/1968 | Humphrey et al. | 117—3 X |
| 3,401,133 | 9/1968 | Grace et al. | 117—161 X |

FOREIGN PATENTS

| 623,410 | 7/1961 | Canada. |

WILLIAM D. MARTIN, Primary Examiner

H. J. GWINNELL, Assistant Examiner

U.S. Cl. X.R.

47—58; 117—161